(No Model.)  2 Sheets—Sheet 1.
W. J. & E. PHELPS.
CAN SOLDERING MACHINE.
No. 573,035.  Patented Dec. 15, 1896.
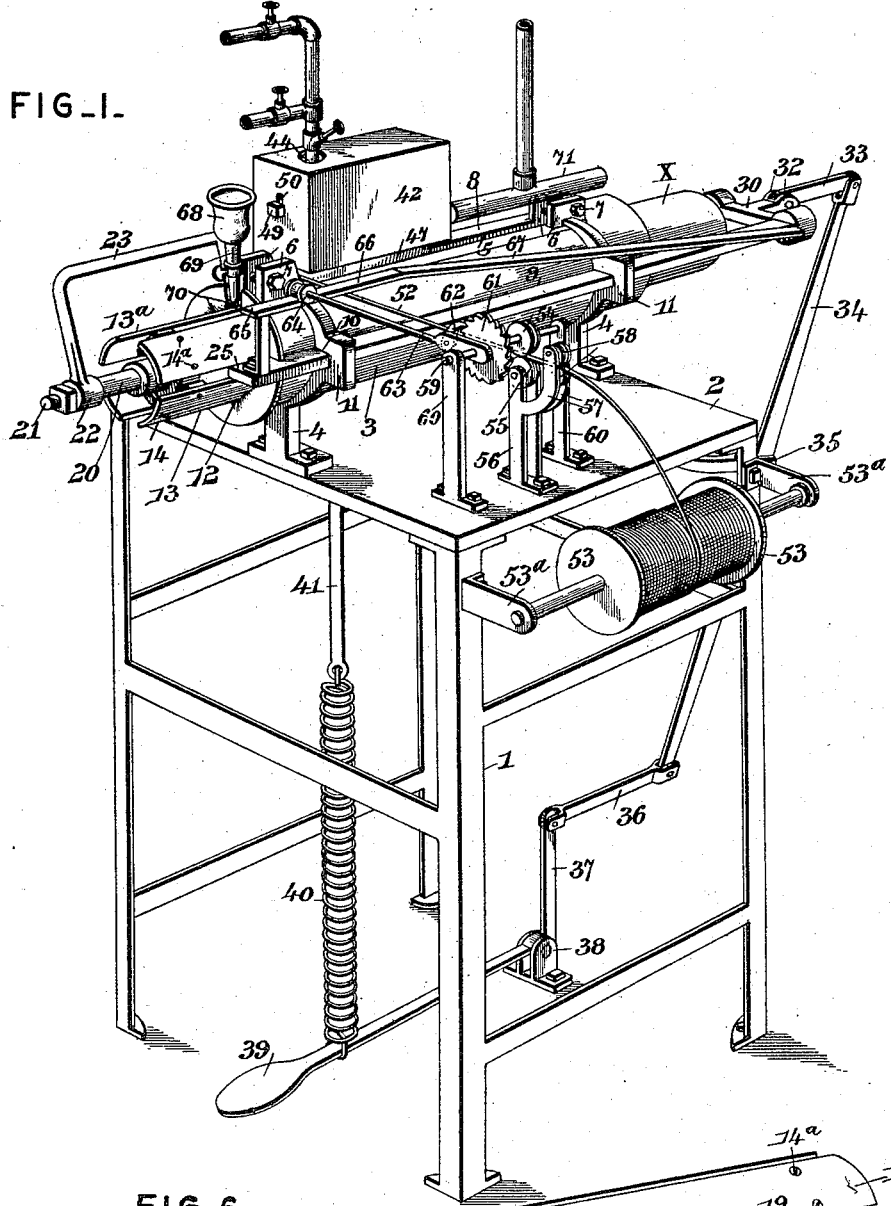
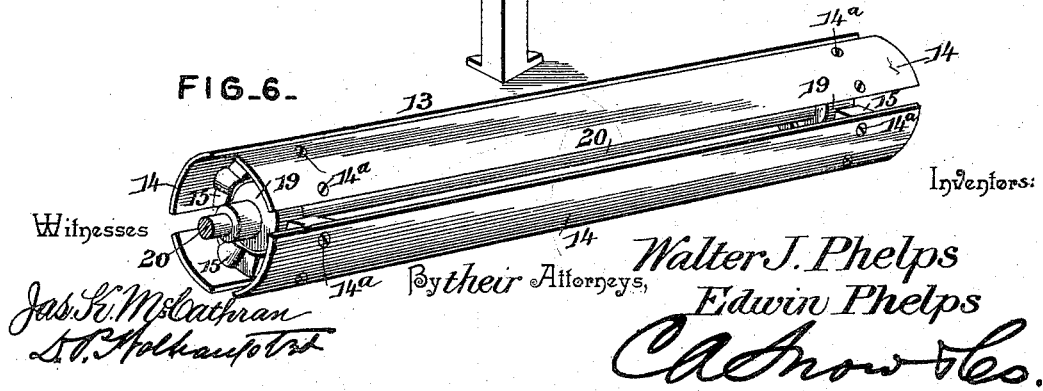
Witnesses
Jas. K. McCathran
L. P. Holthaupt
Inventors:
Walter J. Phelps
Edwin Phelps
By their Attorneys,
C. A. Snow & Co.
THE NORRIS PETERS CO., PHOTO-LITHO., WASHINGTON, D. C.

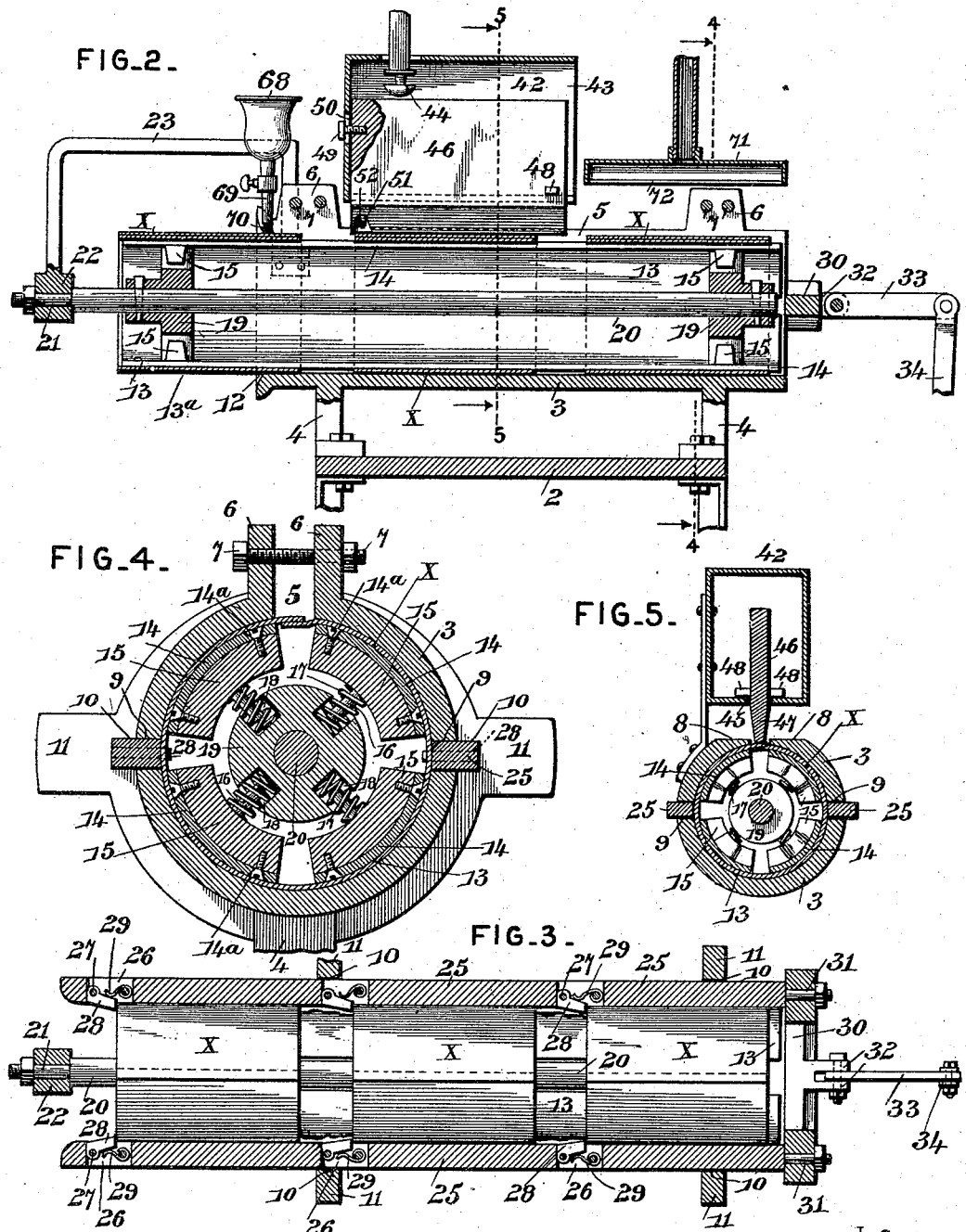

UNITED STATES PATENT OFFICE.

WALTER J. PHELPS AND EDWIN PHELPS, OF BALTIMORE, MARYLAND, ASSIGNORS OF ONE-HALF TO HOSEA F. GOING, OF SAME PLACE.

CAN-SOLDERING MACHINE.

SPECIFICATION forming part of Letters Patent No. 573,035, dated December 15, 1896.

Application filed January 16, 1896. Serial No. 575,768. (No model.)

*To all whom it may concern:*

Be it known that we, WALTER J. PHELPS and EDWIN PHELPS, citizens of the United States, residing at Baltimore, Maryland, have invented a new and useful Can-Soldering Machine, of which the following is a specification.

This invention relates to can-soldering machines; and it has for its object to provide a new and useful machine of this character having simple and efficient means for securely and uniformly soldering the side seam of sheet-metal can-bodies.

To this end the main and primary object of the present invention is to provide a machine for soldering the lap side seam of a can-body so that a perfect body of solder will be distributed over the seam throughout its entire length, and also between the laps forming the seam, whereby a perfect and strong joint will be formed and with a great saving in time and solder.

It is also an object of the invention to so simplify and reduce the parts of the machine that nothing but the actual work required of a machine of this character will be accomplished, that is, providing a machine wherein at one time a can-blank with the side seam thereof soldered will be undergoing the process of cooling, another can-body will be undergoing the process of soldering, while a third can blank or body is being placed in position at the feeding end of the machine, and it will therefore be observed that only three can-bodies will be in the machine at one time, this being all that is actually required of a can-soldering machine.

With these and other objects in view, which will readily appear as the nature of the invention is better understood, the same consists in the novel construction, combination, and arrangement of parts hereinafter more fully described, illustrated, and claimed.

In the drawings, Figure 1 is a perspective view of a can-soldering machine constructed in accordance with this invention. Fig. 2 is a central vertical longitudinal sectional view thereof. Fig. 3 is a central horizontal sectional view of the machine, showing the relative positions of the three can-bodies that are within the machine at one time. Fig. 4 is a transverse sectional view on the line 4 4 of Fig. 2. Fig. 5 is a transverse sectional view on the line 5 5 of Fig. 2. Fig. 6 is a detail in perspective of the expansible core.

Referring to the accompanying drawings, 1 designates a supporting frame or stand supporting in an elevated position the machine-table 2, over which is arranged the horizontal cylindrical shell or casing 3. The shell or casing 3 is provided at its lower side with the short depending attaching-feet 4, bolted or otherwise attached to the machine-table 2 to provide for properly supporting the shell or casing in position. The shell or casing 3 is of a diameter substantially agreeing with the diameter of the can-bodies that are to be soldered by the machine, and in its upper side the shell or casing is provided with a continuous top slot 5, extending continuously from end to end thereof, and at opposite sides of the top slot 5, near the ends of the shell or casing, the latter is provided with oppositely-located upwardly-projecting adjusting-lugs 6, which receive suitable adjusting-screws 7. The adjusting-screws 7, which engage the oppositely-located lugs of the shell or casing at opposite sides of the top slot therein, when manipulated provide means for slightly increasing or diminishing the interior diameter of the shell or casing, so that the same may be adjusted to accommodate slight variations in the size or diameters of the can-bodies that are to be soldered.

Between the opposite end pairs of the lugs 6 the cylindrical shell or casing 3 is preferably flattened or thinned on its upper side, as at 8, at directly opposite sides of the top slot 5, in order that the operator can readily see the work through said slot, and in its diametrically opposite sides the shell or casing is also provided with the opposite longitudinal guide-slots 9, which extend from end to end of the shell or casing and communicate with the guide-openings 10, formed in the guide-lugs 11, cast exteriorly on the shell or casing near its opposite ends and coöperating with the slots 9, to secure a function hereinafter to be more particularly referred to.

The cylindrical shell or casing 3 is provided at what may be termed its "front" end with a flared feeding-mouth 12, which forms a guide to direct one end of the can-body within one end of the shell or casing when such can-body is being fitted in place to be fed within the shell or casing for the purpose of being soldered, and the said flared mouth 12, at the front end of the cylindrical shell or casing, directly surrounds the expansible core 13, which is arranged to snugly fit inside of the outer cylindrical shell or casing 3. The inner expansible core 13 extends the entire length of the shell or casing within the same and projects a sufficient distance out of and beyond the front end of said shell or casing, as at 13ᵃ, in order to form a receiving end on which may be fitted the unsoldered can-body, so that the same may be readily guided into the front end of the shell or casing between the latter and the core.

The contour of the inner expansible core 13 is cylindrical to agree with the contour of the shell or casing in which it fits, and said expansible core essentially comprises a circular group of parallel-spaced segmental plates 14, disposed longitudinally of the shell or casing, within which the core is arranged, and the segmental core-plates 14 have secured to their inner sides, near their opposite ends, by means of the screws 14 or other suitable fasteners, the segmental cleat-irons 15. The segmental cleat-irons 15 carry the plates 14, and are provided at their inner sides with the inwardly-extending and radially-disposed pins 16, on which are arranged the expanding-springs 17, the inner ends of which springs rest in the spring-sockets 18, formed in the periphery of the collars 19, fitted on a centrally-arranged core-rod 20. The core-rod 20 is arranged centrally within the core and, extending longitudinally the entire length thereof, projects beyond the front projecting end 13ᵃ of the core, and is provided at such projecting end with a bolt portion 21, which receives the collar 22 at the outer end of the angled supporting-rod 23, preferably secured at one end to the outside of the shell or casing 3, to provide a rigid support for the expansible core to prevent longitudinal or lateral slipping thereof and thereby maintaining the same in a proper relative position. The expanding-springs 17 normally hold the segmental core-plates 14 adjusted out against the inner side of the cylindrical shell or casing 3, and the said core-plates are so arranged that the longitudinal space between the uppermost pair of such plates agrees or coincides with the longitudinal top slot 5 of the shell or casing, and at diametrically opposite points the spaces between the core-plates at horizontally-opposite points of the core agree or coincide with the longitudinal guide-slots 9, formed in opposite sides of the shell or casing for the reception of the opposite sliding or reciprocating carrier-bars 25.

The opposite carrier-bars 25 slide within the guide-grooves 9 and also in the guide-openings 10 of the lugs 11, said lugs, being closed at their outer sides, necessarily providing means for holding the carrier-bars properly in position within the guide-slots of the shell or casing, and at regularly spaced intervals the carrier-bars 25 are provided with recesses or openings 26, in which are pivotally mounted, as at 27, the spring-adjusted dogs 28. The dogs 28 are normally projected out of the recesses or openings 26 beyond the inner sides of the bars 25 by means of the adjusting-springs 29, disposed within said recesses or openings 26, and at this point it will be noted that the pivoted ends of said dogs are disposed toward the front feeding end of the machine in order that the dogs will ride over the exterior of the can-bodies X within the shell or casing, and will swing back within their recesses or openings 26 when the said carrier-bars are reciprocated or moved in a direction toward the front feeding end of the machine.

The spring-adjusted catch-dogs 28 in the opposite carrier-bars 25 are arranged directly opposite each other in order to form pairs of said dogs in the same horizontal plane, and by reference to Fig. 3 of the drawings it will be observed that three of such pairs of dogs are employed in the machine in order that each pair of dogs will engage against one end of a can-body, whereby when the carrier-bars are reciprocated in one direction the three can-bodies within the machine will be simultaneously adjusted to their proper positions.

The reciprocating carrier-bars 25 are connected together beyond the rear discharging end of the cylindrical shell or casing by means of a cross-head 30, suitably bolted to one end of said carrier-bars, as at 31, and provided at a central point with a pair of lugs 32, between which is pivoted one end of a link 33, pivotally connected at its other end to the upper end of an oscillating lever 34. The oscillating lever 34 is pivotally supported intermediate of its ends, as at 35, on the frame or stand 1, and is pivotally connected at its lower end to one end of a short connecting-link 36, the other end of which link is connected to one arm of a bell-crank treadle-lever 37. The bell-crank treadle-lever 37 is pivotally mounted at its angle in a suitable support 38, and is provided at the extremity of one arm with a foot portion 39, adjacent to which foot portion the said lever 37 has connected thereto one end of a spring 40, the other upper end of which spring is connected to a fixed point of attachment 41 of the supporting frame or stand 2.

Suitably supported above the cylindrical shell or casing 3, between the ends thereof, is a heater box or casing 42, open at one end, as at 43, to provide for a draft or circulation therethrough to insure the proper distribution of the flame from the hydrocarbon-burner 44, which is arranged within the upper part of said heater box or casing, although it will be understood that any other suitable burner may be arranged within the heater box or casing to secure the same result. The heater box or casing 42 is provided centrally in its bottom with a longitudinal slot 45, through which extends the soldering-iron 46. The soldering-iron 46 is of substantially the same length as the heater box or casing 42, and is provided with a contracted lower portion 47, disposed below the bottom of the box or casing 42 and projecting into the top slot 5 of the shell or casing 3, so as to rest on the side-lap seam of the can-body as the same is carried through the shell or casing. The soldering-iron 46 is provided near one end with oppositely-projecting pins 48, which rest on the bottom of the box or casing 42 at opposite sides of the bottom slot 45 thereof to limit the downward projection of the iron, and in the end opposite said pins 48 the said iron has fitted therein a headed screw 49, working in a slot 50, formed in one end of the box or casing 42 and preventing longitudinal play of the soldering-iron, while at the same time allowing the same to act as a "float-iron," so that the iron will rest its entire weight on the seam of the can-body being adjusted thereunder.

The soldering-iron 46 is provided in one side thereof and at its front lower edge with a solder recess or pocket 51, into which is fed one end of a strip of solder 52, which strip of solder is conveniently arranged on a revolving spool or reel 53, the spindle extremities of which are conveniently journaled in the bearing-brackets 53ª, projected from one side of the frame or stand 1. At a point at one side of the shell or casing the strip of solder 52 is arranged to pass between a pair of friction feed-rolls 54 and 55, the lower of which rolls, 55, is mounted in a suitable bearing-support 56, arranged on the table 2, and from one side of which may be conveniently projected a bracket 57, carrying a pair of guide-rolls 58, which properly guide the strip of solder in between the feed-rolls, and at the same time form a check to prevent the same from slipping out from between the feed-rolls. The upper of said feed-rolls, 54, is mounted on a short feed-shaft 59, journaled in suitable bearing-supports 60, projected from the table 2, and said feed-shaft 59 has mounted thereon a ratchet feed-wheel 61, the teeth of which are engaged by a pawl 62, adjustably mounted at one side of the feed-lever 63, loosely mounted at one end on the shaft 59 and carrying at its other end a track roller or wheel 64, riding on the track-rail 65, suitably supported above and carried by one of the carrier-bars 25. The said track-rail 65 is provided with a front horizontal portion 66 and a rear inclined portion 67, declining from the horizontal portion 6 to a plane materially below the said horizontal portion of the track-rail.

Suitably supported in front of the soldering-iron and the heater box or casing therefor is an acid-reservoir 68, having a suitable feed-spout 69, carrying a brush 70, projecting into the slot 5 at the extreme front end of the shell or casing and providing means for distributing or wiping acid over the lap-seam of the can-body before the same is carried under the soldering-iron.

After the can-body has been carried from under and in rear of the soldering-iron the soldered joint thereof will ordinarily cool before the can-body is discharged out of and drops from the rear discharging end of the shell or casing, but, if found necessary, a supplemental cooling device may be employed, such as a longitudinally-slitted air-distributing pipe 71. The air-distributing pipe 71 is arranged longitudinally above the shell or casing in rear of the soldering-iron, so as to dispose the longitudinal bottom slit 72 thereof directly above the top slot 5, whereby a blast of cold air may be directed on the soldered joint to positively insure the cooling thereof before the can-body is discharged from the shell or casing.

In operating the machine the operator is stationed at the front end thereof with any number of can-bodies, which have been previously rolled or bent into a cylindrical shape, within convenient reach. By now depressing the bell-crank treadle-lever the carrier-bars 25 will be carried rearwardly out of the way, and in this movement it will be observed that the track-roller of the feed-lever 63 will ride from the inclined portion 67 of the track-rail 65 onto the horizontal portion 66. After this adjustment of the carrier-bars the operator places a can-body on the front projecting portion 13ª of the expansible core and adjusts one end of a can-body into the flaring feed-mouth 12 of the shell or casing 3, so that the can-body will be held gripped between the expansible core and the shell or casing and will have a perfect outside fit to the said shell or casing, and in thus adjusting the can-body in place at the front end of the machine the overlapping edges of the can-body forming the side seam will be disposed directly in the center of the top slot 5 and the space between the upper pair of core-plates 14, as very plainly illustrated in Fig. 4 of the drawings. At this point in the operation the operator releases the pressure of the foot on the treadle, allowing it to rise under the influence of the spring 40, which movement will cause the carrier-bars to slide forwardly, so that the front pair of catch-dogs 28 will spring into engagement with the outer end of the can-body just fitted on the outer front projecting end of the expansible core, and by again depressing the treadle the said can-body will be carried directly under the soldering-iron. At this point by holding the treadle down the operator can place another can-body in position on the front projecting end of the core, as already described, so by a repetition of this operation it must be obvious that after the machine has been once filled with the can-bodies there will always be three of such can-bodies in position, one at the feeding end of the machine, one under the soldering-iron, and one in rear of the soldering-iron in the act of cooling either with or without the air-blast or other cooling device.

The pairs of catch-dogs are so placed as to each engage a can-body, as already described, it being noted that the can-body at the front feed end of the machine passes under the brush of the acid-feed before it reaches the soldering-iron, which rests directly on the lap side seam thereof. Immediately as a can-body commences to pass under the soldering-iron it will be noted that the roller 64 of the feed-lever 63 will be riding on the inclined portion 67 of the track-rail 65, as such track-rail is drawn under such roller with the rearward reciprocation of the carrier-bar. The rearward reciprocation of said track-rail will therefore elevate the feed-lever 63 and communicate motion to the ratchet-wheel 61, so as to turn the feed-shaft 59 and operate the feed-rolls 54 and 55, so as to feed the strip of solder toward the soldering-iron and directly against said soldering-iron within the recess or pocket 51 thereof, the solder being melted at its point of contact with the soldering-iron, so that it will run on the seam of the can-body as it passes thereunder. Before the can-body passes entirely under the soldering-iron, or, more accurately, when the can-body has passed half of its length under the iron, the horizontal portion 66 of the track-rail will have passed under the roller of the feed-lever 63 and thereby stop the feeding mechanism, and consequently the feed of the strip of solder against the soldering-iron. As the can-body passes under the soldering-iron for the remaining half of its length the solder flowed onto said can-body while passing half under the iron will be distributed by the latter smoothly and uniformly over the side seam, and will thereby prevent uneven or lumpy soldering, which is liable to occur if the solder is fed to the iron during the entire time that a can-body is passing thereunder. In this connection it will be further observed that while the can-body is in the machine there is no direct support below the lap side seam, so as to hold the lapping edges of the can-body tightly together, and this feature is important in the present machine, because during the process of distributing the solder over said side seam the solder runs into the space between the laps and leaves a perfect body of solder between said laps, so as to insure a perfectly tight joint when the solder cools.

Many other advantages than those stated will readily suggest themselves to those skilled in the art, and it will be understood that changes in the form, proportion, and the minor details of construction may be resorted to without departing from the principle or sacrificing any of the advantages of this invention.

Having thus described the invention, what is claimed, and desired to be secured by Letters Patent, is—

1. In a can-soldering machine, an outer cylindrical shell or casing, having a longitudinal top slot, a stationary cylindrical expansible core arranged within said shell or casing and extending the entire length thereof, the soldering-iron, and means for sliding a can-body longitudinally between said shell or casing and said core, substantially as set forth.

2. In a can-soldering machine, a cylindrical shell or casing having a longitudinal top slot, a rigidly-supported stationary expansible core arranged within the shell or casing and normally snugly fitting the interior thereof, a soldering-iron arranged to extend within said top slot, and a carrying device for positively carrying a can-body under the soldering-iron and between said core and the shell or casing, substantially as set forth.

3. In a can-soldering machine, a cylindrical shell or casing, a suitably-arranged soldering-iron, a stationary expansible core snugly fitting within the shell or casing and extending the entire length thereof, and means for carrying a can-body between the core and the shell or casing and against said soldering-iron, substantially as set forth.

4. In a can-soldering machine, a cylindrical shell or casing provided with a continuous longitudinal top slot, a suitably-arranged soldering-iron, carrying mechanism for the can-bodies, and means for adjusting the distance between the edges of said top slot to slightly vary the diameter of the shell or casing, substantially as set forth.

5. In a can-soldering machine, a stationary cylindrical shell or casing having a continuous longitudinal top slot and a flared mouth at one end, a rigidly-supported stationary hollow cylindrical expansible core snugly fitting the interior of the shell or casing and extending the entire length thereof, said expansible core having a longitudinal top space coinciding with said top slot, and projecting out of and beyond the flared end of the shell or casing to form a receiving end for the unsoldered can-body, a soldering-iron arranged to extend within the top slot of the shell or casing, and means for sliding a can-body longitudinally between the shell or casing and the stationary core therein, substantially as set forth.

6. In a can-soldering machine, the shell or casing provided with a continuous longitudinal top slot and upwardly-projecting lugs located at directly opposite sides of said top slot, adjusting-screws mounted in said lugs to slightly vary the diameter of the shell or casing, a soldering-iron arranged to extend within said top slot, a cylindrical core arranged within said shell or casing, and means for carrying a can-body between the core and the shell or casing and under said soldering-iron, substantially as set forth.

7. In a can-soldering machine, a cylindrical shell or casing having a continuous longitudinal top slot, a soldering-iron arranged to extend into said top slot, a cylindrical expansible core snugly fitting within the shell or casing and comprising a central core-rod extending longitudinally of the shell or casing, oppositely-located collars fitted on the rod, a circular group of parallel-spaced segmental plates, and expanding-springs arranged between said segmental plates and said collars, and a carrying device for the can-body, substantially as set forth.

8. In a can-soldering machine, a cylindrical shell or casing having a continuous longitudinal top slot, the soldering-iron, a cylindrical expansible core snugly fitting within the shell or casing and comprising a central longitudinal core-rod extended beyond one end of the shell or casing, oppositely-located collars fitted on the rod and having peripheral sockets, a circular group of parallel-spaced segmental plates having cleat-irons on their inner sides concentric with said collars, and expanding-springs arranged in said sockets and normally pressing against said cleat-irons, a rigid supporting-rod suitably connected with the extended end of the core-rod, and a carrying device for the can-body, substantially as set forth.

9. In a can-soldering machine, a cylindrical shell or casing provided with a continuous longitudinally-disposed top slot and in its opposite sides with diametrically opposite guide-slots, a soldering-iron arranged to project into said top slot, a stationary cylindrical expansible core arranged within and extending the entire length of the shell or casing and having at opposite sides longitudinal spaces coinciding with said guide-slots, a pair of reciprocating carrier-bars mounted to slide in said guide-slots and each provided with a series of inwardly-projecting spring-adjusted catch-dogs normally projecting into the longitudinal side spaces of the core, the catch-dogs of the opposite carrier-bars being oppositely arranged in pairs to simultaneously engage successive can-bodies, a cross-head connection between one end of said carrier-bars, and suitable treadle mechanism connected with said cross-head connection to provide for the reciprocation of the carrier-bars in both directions, substantially as set forth.

10. In a can-soldering machine, a cylindrical shell or casing provided with a longitudinal top slot, a cylindrical core arranged within the shell or casing, a heater-box arranged above the shell or casing and provided in its bottom with a longitudinal slot and in one end with a vertically-disposed slot, a burner arranged within the upper part of said heater-box, a soldering-iron arranged within the heater-box and projecting through the bottom slot thereof into the top slot of the shell or casing, said soldering-iron being provided near one end with oppositely-projecting pins disposed above the bottom of the heater-box and at its opposite end with a headed screw projecting through the slot in one end of the heater-box, and a suitable carrier device to move the can-bodies under the soldering-iron between the shell or casing and the core, substantially as set forth.

11. In a can-soldering machine, a cylindrical shell or casing provided with a longitudinal top slot, a cylindrical core arranged within the shell or casing, a soldering-iron arranged to project into said top slot and provided at its front lower edge with a solder recess or pocket, a carrier device for the can-body, a suitably-arranged spool or reel carrying a solder strip, and feed mechanism, controlled by the movement of said carrier device, to provide for feeding the solder strip into said solder recess or pocket during the time that a can-body is passing one-half of its length under the iron, substantially as set forth.

12. In a can-soldering machine, a cylindrical shell or casing provided with a top slot, a cylindrical core arranged within the shell or casing, a soldering-iron arranged to project into said top slot, a reciprocating-carrier device for the can-body, a track-rail fitted to and reciprocated with said carrier device, said track-rail having a front horizontal portion and a rear inclined portion, a suitable holder for a strip of solder, a suitably-arranged pair of friction feed-rolls gripping the strip of solder therebetween to feed the same against one side of the soldering-iron, and a ratchet device operatively connected with one of said feed-rolls and having a movable feed-lever carrying at one end a track-roller resting on said track-rail, substantially as set forth.

In testimony that we claim the foregoing as our own we have hereto affixed our signatures in the presence of two witnesses.

WALTER J. PHELPS.
EDWIN PHELPS.

Witnesses:
JOHN L. WEBB,
ISAAC N. JACKSON.